United States Patent
Yoshida et al.

(10) Patent No.: US 7,993,793 B2
(45) Date of Patent: Aug. 9, 2011

(54) PROCESS FOR PRODUCING POLYMER ELECTROLYTE MEMBRANES FOR FUEL CELLS, POLYMER ELECTROLYTE MEMBRANES FOR FUEL CELLS PRODUCED BY THE PROCESS, AND FUEL CELL MEMBRANE-ELECTRODE ASSEMBLIES USING THE MEMBRANES

(75) Inventors: Masaru Yoshida, Takasaki (JP); Masaharu Asano, Takasaki (JP); Jinhua Chen, Takasaki (JP); Yasunari Maekawa, Takasaki (JP); Toshimitsu Tachibana, Ibaraki (JP); Yozo Nagai, Ibaraki (JP); Soji Nishiyama, Ibaraki (JP)

(73) Assignees: Japan Atomic Energy Agency, Ibaraki (JP); Nitto Denko Corporation, Osaka (JP)

( * ) Notice: Subject to any disclaimer, the term of this patent is extended or adjusted under 35 U.S.C. 154(b) by 986 days.

(21) Appl. No.: 11/727,177

(22) Filed: Mar. 23, 2007

(65) Prior Publication Data

US 2007/0224480 A1 Sep. 27, 2007

(30) Foreign Application Priority Data

Mar. 24, 2006 (JP) ................................. 2006-082321

(51) Int. Cl.
*H01M 8/10* (2006.01)
(52) U.S. Cl. ............. 429/492; 429/493; 521/27; 521/33
(58) Field of Classification Search ............... 429/30, 429/33, 492, 493; 521/27, 33
See application file for complete search history.

(56) References Cited

U.S. PATENT DOCUMENTS

| | | | |
|---|---|---|---|
| 2004/0116546 A1* | 6/2004 | Kosek et al. | 521/27 |
| 2005/0112434 A1* | 5/2005 | Park et al. | 429/30 |
| 2006/0166046 A1* | 7/2006 | Dubitsky et al. | 429/12 |
| 2006/0223895 A1 | 10/2006 | Yoshida et al. | |

FOREIGN PATENT DOCUMENTS

| | | |
|---|---|---|
| JP | 3035885 | 2/2000 |
| JP | 2002-528867 | 9/2002 |
| JP | 2002-352818 | 12/2002 |
| JP | 3385554 | 1/2003 |
| JP | 2003-82129 | 3/2003 |
| JP | 2003-261697 | 9/2003 |
| JP | 2003-308855 | 10/2003 |
| JP | 3498321 | 12/2003 |
| JP | 2004-14436 | 1/2004 |
| JP | 2004-51685 | 2/2004 |
| JP | 2004-59752 | 2/2004 |
| JP | 2004-158270 | 6/2004 |
| JP | 2004-172124 | 6/2004 |
| JP | 2004-300360 | 10/2004 |
| JP | 2005-56787 | 3/2005 |
| JP | 2005-63778 | 3/2005 |
| JP | 2006-282969 | 10/2006 |
| WO | WO 00/24074 | 4/2000 |

* cited by examiner

*Primary Examiner* — Melvin C Mayes
*Assistant Examiner* — Melissa Stalder

(57) ABSTRACT

By performing photograft polymerization of functional monomers such that grafted chains will be introduced from the surface of a polymer base film into its interior without deteriorating its inherent characteristics and also by creating a multiplex crosslinked structure between the grafted chains and the base film under such conditions as to cause preferential radiation-induced crosslinking reaction, there is produced a polymer electrolyte membrane having high enough oxidation resistance and proton conductivity to be suitable for use in fuel cells.

7 Claims, No Drawings

PROCESS FOR PRODUCING POLYMER ELECTROLYTE MEMBRANES FOR FUEL CELLS, POLYMER ELECTROLYTE MEMBRANES FOR FUEL CELLS PRODUCED BY THE PROCESS, AND FUEL CELL MEMBRANE-ELECTRODE ASSEMBLIES USING THE MEMBRANES

BACKGROUND OF THE INVENTION

This invention relates to a process for producing polymer electrolyte membranes that have sufficiently high resistance to oxidation and heat as well as high enough proton conductivity to be suitable for use in fuel cells, polymer electrolyte membranes produced by the process, and fuel cell membrane-electrode assemblies using such membranes.

Fuel cells using polymer electrolyte membranes feature high energy density, so making use of fuels such as methanol and hydrogen, they hold promise for application as power supplies to mobile communication devices, household cogeneration systems, and automobiles or as convenient auxiliary power supplies. One of the most critical aspects of the fuel cell technology is the development of polymer electrolyte membranes having superior characteristics.

In a polymer electrolyte membrane fuel cell, the polymer electrolyte membrane serves to conduct protons and it also plays the part of a diaphragm which prevents mixing of the fuel hydrogen or methanol with the oxidant air (oxygen). The polymer electrolyte membrane has several requirements to meet: large ion-exchange capacity; sufficient chemical stability of the membrane to allow for prolonged application of an electric current, in particular, high resistance (oxidation resistance) to hydroxide radicals and the like which are principal factors that contribute to deterioration of the membrane; heat resistance at 80° C. and above which is the cell operating temperature range; and constant and high water retention of the membrane which enables it to keep low electrical resistance. In addition, the membrane which also plays the part of a diaphragm is required to have high mechanical strength and dimensional stability, as well as having no excessive permeability to the fuel hydrogen gas or methanol or oxygen gas.

Early models of the polymer electrolyte membrane fuel cell used a hydrocarbon-based polymer electrolyte membrane produced by copolymerization of styrene as a monomer capable of retaining sulfonic acid groups and divinylbenzene known as a chemical cross-linking agent. However, this polymer electrolyte membrane, being very poor in durability due to low oxidation resistance, did not have high practical applicability and was later replaced extensively by perfluorosulfonic acid-based membranes such as DuPont's Nafion®.

The conventional perfluorosulfonic acid-based electrolyte membranes such as Nafion® have high chemical durability and stability but, on the other hand, their ion-exchange capacity is as small as about 1 meq/g and, due to insufficient water retention, the membrane will dry up, thereby impedes proton conduction or, in the case of using methanol for fuel, there occurs swelling of the membrane or cross-over of the methanol.

If, in order to increase the ion-exchange capacity, one attempts to introduce more sulfonic acid groups, the membrane, due to the absence of a cross-linked structure in polymer chains, will swell and its strength drops so markedly that it is prone to break easily. Therefore, with the conventional perfluorosulfonic acid-based electrolyte membranes, the quantity of sulfonic acid groups had to be adjusted to small enough levels to guarantee the required membrane strength, so that one could only produce membranes having ion-exchange capacities of no more than about 1 meq/g.

In addition, the perfluorosulfonic acid-based electrolyte membranes such as Nafion® have the problem of involving a difficult and complex monomer synthesis; what is more, the process of polymerizing the synthesized monomers to produce the intended polymer electrolyte membrane is also complex and yields a very expensive product, thereby presenting a major obstacle to realizing a commercial proton-exchange membrane fuel cell that can be installed on automobiles and other equipment. Hence, efforts have been made to develop low-cost, yet high-performance electrolyte membranes that can be substituted for Nafion® and other conventional perfluorosulfonic acid-based electrolyte membranes.

In the pre-irradiation, post-graft polymerization method and the simultaneous irradiation and graft polymerization method which are closely related to the present invention, attempts are being made to prepare solid polymer electrolyte membranes by grafting into polymer membranes those monomers into which sulfonic acid groups can be introduced. The present inventors previously conducted intensive studies with a view to developing such new solid polymer electrolyte membranes and found that solid polymer electrolyte membranes characterized by a wide range of controllability of ion-exchange capacity could be produced by first introducing a styrene monomer into a poly(tetrafluoroethylene) film having a cross-linked structure by a radiation-induced graft reaction and then sulfonating the polystyrene grafts. The present inventors filed a patent application for the solid polymer electrolyte membrane having such characteristics and a process for producing it (JP 2001-348439 A). However, this polymer electrolyte membrane was such that the polystyrene grafted chains were composed of hydrocarbons, so when it was supplied with an electric current for a prolonged period of time, the grafted chain portion was partly oxidized to cause gradual decrease in the ion-exchange capacity of the membrane.

In order to solve these problems, the present inventors searched for monomeric styrene substitutes and found that a solid polymer electrolyte membrane more durable than the polystyrene grafted chains by at least two orders of magnitude could be produced by a process in which a monomer that was hydrophobic enough to retain sulfonic acid groups was combined with a chemical cross-linking agent that had balance between rigidity and flexibility and then the pre-irradiation, post-graft polymerization method was performed. Based on this finding, the present inventors filed a patent application for the solid polymer electrolyte membrane and a process for producing it (Japanese Patent Application 2005-170798).

It was also found that in the process of pre-irradiation of a polymer base film comprising a hydrocarbon matrix, a hydrocarbon-fluorocarbon matrix or a fluorocarbon matrix, the active sites (radicals) necessary for initiating graft polymerization were generated and a crosslinked structure was created but at the same time the substrate's decomposition would also take place depending on the difference in chemical structure between bases, as well as on such conditions as the irradiation atmosphere, temperature and pressure; as a result, the inherent characteristics of the base (e.g. mechanical strength, heat resistance, and durability) deteriorated.

SUMMARY OF THE INVENTION

The present invention has been accomplished in view of the aforementioned problems and by performing photograft polymerization of functional monomers such that grafted chains would be introduced from the surface of a polymer base film into its interior without deteriorating its inherent characteristics and also by creating a multiplex crosslinked structure between the grafted chains and the base film under such conditions as to cause preferential radiation-induced crosslinking reaction, the present inventors succeeded in providing heretofore unattainable high enough proton conductivities at low degrees of grafting while solving the most crucial problem of low oxidation resistance.

In one aspect, the present invention provides a polymer electrolyte membrane having sufficiently high proton conductivity and oxidation resistance to be suitable for use in fuel cells.

In another aspect, the present invention provides a process for producing the polymer electrolyte membrane.

In the present invention, a polymer base film is coated with a layer containing a photopolymerization initiator and the surface of the coated layer, as it carries in contact with it a liquid mixture of a vinyl monomer capable of retaining sulfonic acid groups with or without a polyfunctional vinyl monomer that is necessary for introducing a chemical crosslinked structure, is irradiated with ultraviolet rays in either a liquid- or gas-phase system to induce graft polymerization reaction of the vinyl monomer or monomers such that grafted chains will be introduced from the substrate's surface into the interior, and subsequently the introduced grafted chains themselves, the grafted chains and the molecular chains in the base film, and the molecular chains themselves in the base film are subjected to radiation-induced multiplex crosslinking, and finally sulfonic acid groups are introduced.

The polymer electrolyte membrane of the present invention is characterized in that the degree of grafting as the ratio of the weight of the grafted molecular chains to the polymer base film is 6 to 80% and that it has an ion-exchange capacity of 0.3 to 3.0 meq/g. The polymer electrolyte membrane of the present invention has the following additional features: its ion-exchange capacity and other characteristics can be controlled over an appropriate and yet wide range; single-stranded grafted chains that retain sulfonic acid groups pass through a cross section of the membrane, so it can be provided with high proton conductivity even if it has only a small degree of grafting; it has high dimensional stability; in particular, the multiplex crosslinked structure that could be created between the grafted chains and the polymer base film contributes to assuring excellent oxidation resistance.

In yet another aspect, the present invention provides a membrane-electrode assembly using the polymer electrolyte membrane. The membrane-electrode assembly comprises the polymer electrolyte membrane having a pair of gas diffusion electrodes joined to opposite sides thereof, each gas diffusion electrode having a catalyst layer.

The operating principle of a fuel cell is such that the fuel hydrogen or methanol is supplied to the gas diffusion electrode on the anode side whereas the oxidant oxygen or air is supplied to the other gas diffusion electrode on the cathode side, with an external load circuit being connected between the two electrodes. In this system, a proton ($H^+$) generated at the anode passes through the polymer electrolyte membrane to the cathode, where it reacts with the oxygen to produce water. What is important here is that the polymer electrolyte membrane should play a part as a medium for transferring protons while at the same time it functions as a separator between the hydrogen gas and the oxygen gas.

The polymer electrolyte membrane produced by the present invention is characterized in that it has high oxidation resistance, proton conductivity, dimensional stability and methanol resistance and it is also characterized in that its ion-exchange capacity can be controlled over a wide range. Having these features, the polymer electrolyte membrane of the present invention is particularly suitable for use in fuel cells.

DETAILED DESCRIPTION OF THE INVENTION

The term "polymer base film" as used herein shall mean polymeric materials in film shape that serve as the substrate for electrolyte membranes. The polymer base films that can be used in the present invention are not limited in any particular way as long as a crosslinked structure can be introduced by irradiation with γ-rays, electron beams or other radiations. Applicable examples include films that are composed of poly(vinylidene fluoride), ethylene tetrafluoroethylene copolymer, polyethylene, polypropylene, polyethylene terephthalate, polyimide, acrylonitrile-butadiene-styrene copolymer, etc.

The vinyl monomers that are photografted into the polymer base films in the present invention may be selected from among the following two groups and used either individually or in admixture.

(1) Group A (Monofunctional Vinyl Monomer into which Sulfonic Acid Groups can be Introduced):
a monomer selected from the group consisting of 1) styrene; 2) alkylstyrenes such as methylstyrenes (e.g., α-methylstyrene and vinyltoluene), ethylstyrene, dimethylstyrene, trimethylstyrene, pentamethylstyrene, diethylstyrene, isopropylstyrene, and butylstyrenes (e.g., 3-tert-butylstyrene and 4-tert-butylstyrene); 3) halogenated styrenes such as chlorostyrene, dichlorostyrene, trichlorostyrene, bromostyrenes (e.g., 2-bromostyrene, 3-bromostyrene, and 4-bromostyrene), and fluorostyrenes (e.g., 2-fluorostyrene, 3-fluorostyrene, and 4-fluorostyrene); 4) alkoxystyrenes such as methoxystyrene, methoxymethylstyrene, dimethoxystyrene, ethoxystyrene, and vinylphenylallyl ether; 5) hydroxystyrene derivatives such as hydroxystyrene, methoxyhydroxystyrene, acetoxystyrene, and vinylbenzyl alkylethers; 6) carboxystyrene derivatives such as vinyl benzoate and formylstyrene; 7) nitrostyrenes such as nitrostyrene; 8) aminostyrene derivatives such as aminostyrene and dimethylaminostyrene; and 9) ion-containing styrene derivatives such as vinyl benzylsulfonates and styrene sulfonyl fluorides.

(2) Group B (Polyfunctional Vinyl Monomers):
a monomer selected from the group consisting of bis(vinylphenyl)ethane, divinylbenzene, 2,4,6-triallyloxy-1,3,5-triazine (triallyl cyanurate), triallyl-1,2,4-benzene tricarboxylate (triallyl trimellitate), diallyl ether, triallyl-1,3,5-triazine-2,4,6-(1H,3H,5H)-trione, 2,3-diphenylbutadiene, 1,4-diphenyl-1,3-butadine, 1,4-divinyloctafluorobutane, bis(vinylphenyl)methane, divinylacetylene, divinyl sulfide, divinyl sulfone, divinyl ether, divinyl sulfoxide, isoprene, 1,5-hexadiene, butadiene, and 1,4-divinyl-2,3,5,6-tetrachlorobenzene.

The photopolymerization initiator that is to be contained in the surface layer of the polymer base film is activated upon exposure to ultraviolet rays and examples of such initiator include: xanthone derivatives such as xanthone, diethyl thioxanthone and 2-chlorothioxanthone; diazo compounds such as azobisisobutyronitrile and hydrazone; and peroxides such as benzoyl peroxide and di-t-butyl peroxide. The photopolymerization initiator to be used in the present invention is preferably a compound which, in the process of exposure to light, will fragment to generate radicals. If desired, with a view to improving such properties as the affinity and adhesion between the photopolymerization initiator and the polymer base film, the photopolymerization initiator may be dissolved in an organic solvent containing a fixing agent such as poly(vinyl acetate) before it is applied to form a coated layer. The layer-forming composition described above may be applied to the polymer base film by a known technique such as spray coating, dipping or spin coating. The concentration of the photopolymerization initiator is preferably between 0.05 and 5 wt %, and that of the fixing agent is preferably between 0.01 and 3 wt %.

Photograft polymerization of the above-described monomers into the polymer base film can be performed in either a liquid- or gas-phase system. In the case of a liquid-phase system, a sealable glass ampoule equipped with a stopcock is filled with a liquid mixture comprising vinyl monomers, water and an organic solvent; then the polymer base film coated with the photopolymerization initiator is immersed in the liquid mixture and, after bubbling an inert gas such as nitrogen gas, subjected to graft polymerization at a temperature of 40 to 90° C. under exposure to light. In the case of a gas-phase system, the polymer base film coated with the photopolymerization initiator is put into a sealable glass ampoule equipped with a stopcock as it contains a liquid mixture comprising vinyl monomers, water and an organic solvent, provided that the polymer base film is not brought into direct contact with the liquid mixture but that the latter is heated at a temperature of 40 to 90° C. in the presence of an inert gas such as nitrogen gas to vaporize the vinyl monomers, with the resulting vapor being used to perform photograft polymerization. The organic solvent to be used in photograft polymerization is preferably such that it can dissolve the vinyl monomers while it is miscible with water. Examples of this organic solvent include alcohols such as methanol, as well as acetone, tetrahydrofuran, dimethyl sulfoxide, dimethylformamide, and methyl ethyl ketone. The concentration of the organic solvent as it is mixed with water in the solvent system is appropriately between 1 and 40 vol %.

Ultraviolet rays are the most preferred as the light rays that are applied to initiate graft polymerization. Light sources of ultraviolet rays include an ultrahigh-pressure mercury lamp, a high-pressure mercury lamp, a metal halide lamp, a xenon lamp, a low-pressure germicidal lamp, etc. When a 400-W high-pressure mercury lamp is used, the irradiation time is preferably between 30 and 600 minutes.

A crosslinked structure is created in the polymer base film by irradiating it with electron beams or γ-rays after grafted molecular chains have been introduced into it. In accordance with this method, the molecular chains themselves in the polymer base film, the grafted molecular chains themselves, or the molecular chains in the polymer base film and the grafted molecular chains can be simultaneously subjected to multiplex crosslinking and, as a result, one can produce a polymer electrolyte membrane for fuel cells having even higher oxidation resistance.

The polymer electrolyte membrane according to the present invention is such that its ion-exchange capacity can be varied by controlling the amount of grafts and the amount of sulfonation reaction, namely, the amount of sulfonic acid groups to be introduced. In the present invention, the degree of grafting as the ratio of the weight of the grafted molecular chains to the weight of the polymer base film ranges preferably from 6 to 80%, more preferably from 10 to 50%.

The term "ion-exchange capacity" as used herein is calculated for the molar amount of ion-exchange groups per membrane's dry weight and expressed in meq/g. Depending on the type of the graft monomer used, the electrolyte membrane has an ion-exchange capacity smaller than 0.3 meq/g if the degree of grafting is less than 10%, and the membrane will swell excessively if the degree of grafting is more than 100%. In other words, the ion-exchange capacity increases if the degree of grafting is increased to introduce more ion-exchange groups. However, if an excessive amount of ion-exchange groups is introduced, the membrane will swell when incorporating water and its strength drops. Hence, the polymer electrolyte membrane of the present invention preferably has an ion-exchange capacity of 0.3 meq/g to 3.0 meq/g, more preferably 0.3 meq/g to 2.0 meq/g.

The percent water content in the polymer electrolyte membrane of the present invention can be controlled by changing the substrate for grafting, the amount of sulfonic acid groups to be introduced, the molecular structure of the graft monomer, and by creating a multiplex crosslinked structure through exposure to radiation. If an electrolyte membrane having an unduly low percent water content is used in a fuel cell, a slight change in the operating conditions will undesirably change its proton conductivity and gas permeation coefficient. Most of the molecular chains in the conventional Nafion® membrane are composed of [—$CF_2$—] and it has no crosslinked structure; therefore, if the fuel cell is operated at 80° C. and above, the membrane will absorb an excessive amount of water to swell and its proton conductivity will drop rapidly.

In the case of the polymer electrolyte membrane of the present invention, exposure to radiation can create a multiplex crosslinked structure between the grafted molecular chains that can retain sulfonic acid groups and the molecular chains in the polymer base film and, hence, the percent water content of the membrane can be controlled over the range from 10 to 100 wt %, primarily by adjusting the amount of sulfonic acid groups. In general, the percent water content of the membrane increases with increasing ion-exchange capacity and the percent water content in the polymer electrolyte membrane of the present invention can be adjusted to lie between 10 and 100 wt %, preferably between 20 and 70 wt %.

After creating the multiplex crosslinked structure in the polymer base film by exposure to radiation, sulfonic acid groups are introduced into the grafted molecular chains and this can be done by reacting the phenyl groups in those chains with a solution of chlorosulfonic acid in dichloroethane or chloroform.

Further speaking of the polymer electrolyte membrane, the higher its proton conductivity which is related to its ion-exchange capacity, the smaller its electrical resistance and the higher its performance as an electrolyte membrane. If the proton conductivity of the electrolyte membrane at 25° C. is less than 0.05 $(\Omega \cdot cm)^{-1}$, the power performance of a fuel cell using that membrane often drops significantly and, hence, the proton conductivity of the polymer electolyte membrane is often designed to be at least 0.05 $(\Omega \cdot cm)^{-1}$, and at least 0.10 $(\Omega \cdot cm)^{-1}$ in the case of a polymer electrolyte membrane with higher performance. The polymer electrolyte membrane of the present invention showed a proton conductivity at 25° C. that was higher than those of the Nafion® membrane and the membrane synthesized using radiation-induced graft polymerization. This might be explained as follows: the grafted molecular chains capable of retaining sulfonic acid groups that had been synthesized using photograft polymerization were present as single-stranded chains of the nano order in the direction of the membrane's thickness, thereby increasing the transferability of protons; in addition, the multiplex crosslinked structure that had been created suppressed the swelling of the membrane that would otherwise occur in the presence of water; as a result, adjacent sulfonic acid groups interacted easily enough to enhance the conduction of protons. It should be particularly noted that single-stranded grafted chains can be introduced in the direction of the membrane's thickness only by the photograft polymerization method which allows grafted chains to extend from the membrane's surface into its interior.

In order to enhance the proton conductivity of the polymer electrolyte membrane, one may try to reduce its thickness. However, given the current technology, an unduly thin polymer electrolyte membrane is easy to break and considerable difficulty is involved in manufacturing membranes. Therefore, conventional polymer electrolyte membranes are 30 to 200 μm thick. In the case of the present invention, an effective membrane thickness is between 10 and 200 μm, preferably between 20 and 150 μm.

Methanol is one of the current fuel candidates for use in fuel cells. However, Nafion® which is a perfluorosulfonic acid-based membrane does not have any crosslinking structure between the molecular chains and will swell significantly in the fuel methanol which then diffuses from the anode (fuel electrode) to the cathode (air electrode) through the membrane; this phenomenon, commonly called "fuel cross-over", is a serious problem since it lowers the efficiency of power generation. However, in the polymer electrolyte membrane produced by the present invention, the grafted molecular chains formed by introducing the sulfonic acid groups crosslink with the polymer base film to create a structure that will not readily swell and the swelling of the membrane in alcohols including methanol is hardly recognizable. Therefore, the membrane finds particular use in a direct-methanol fuel cell, or a fuel cell that can utilize methanol directly for fuel without using a reformer.

In fuel cell membranes, their oxidation resistance is a crucial characteristic that is related to their durability (service life). Oxidation is a phenomenon where OH and other radicals that are generated during cell operation attack the polymer electrolyte membrane to deteriorate it. As a matter of fact, polymer electrolyte membranes produced by first grafting styrene as a hydrocarbon-containing monomer to the polymer film through radiation-induced graft polymerization and then sulfonating the polystyrene graft chains are very low in oxidation resistance. For instance, a polymer electrolyte membrane produced by sulfonating polystyrene grafted chains that have been introduced at a degree of 40% will deteriorate in about 20 hours when it is immersed in a 3% aqueous hydrogen peroxide solution with 60° C. and proton conductive poly(styrenesulfonic acid) groups will come out of the membrane. This is because the attack of OH radicals causes the polystyrene grafted chains to decompose easily.

In contrast, the polymer electrolyte membrane produced by the present invention is such that photograft polymerization enables grafted chains to be introduced as single-stranded chains of the nano order from the surface of the polymer base film into its interior and, what is more, the introduced grafted molecular chains themselves, the molecular chains themselves in the polymer base film and even the grafted molecular chains and the molecular chains in the polymer base film can be provided with a multiplex crosslinked structure by exposure to radiation; hence, the polymer electrolyte membrane produced by sulfonating the introduced grafted molecular chains has such high oxidation resistance that even if it is placed in a 3% aqueous hydrogen peroxide solution with 60° C. for more than 200 hours, its ion-exchange capacity hardly changes; what is more, despite its low degree of grafting, the polymer electrolyte membrane can exhibit high enough proton conductivity.

We next describe an advantageous embodiment of still another aspect of the present invention as it relates to a membrane-electrode assembly using the polymer electrolyte membrane according to the first aspect of the present invention. The membrane-electrode assembly of the present invention comprises the above-described polymer electrolyte membrane of the present invention that is sandwiched between an anode electrode and a cathode electrode.

The anode and cathode electrodes that can be used in the present invention are not limited in any particular way as long as they are common in the art of interest. For example, the anode electrode may be carbon paper coated with the catalyst platinum-ruthenium on carbon black whereas the cathode electrode may be carbon paper coated with the catalyst platinum on carbon black. The amounts in which the anode and cathode support the respective catalysts may be determined as appropriate.

To manufacture the membrane-electrode assembly of the present invention, the polymer electrolyte membrane of the present invention as described above is placed between the anode and cathode electrodes and joined together by hot pressing or any other method that is common in the art of interest.

EXAMPLES

On the following pages, the present invention is described with reference to examples and comparative examples, to which the present invention is by no means limited. The various parameters referred to in those examples and comparative examples were measured by the following methods.
(1) Degree of Grafting (%)

If the base film is taken as the backbone chain portion and that portion of the base film into which a fluorine-containing monomer, a hydrocarbon-containing monomer and the like have been grafted is taken as the grafted chain portion, the weight ratio of the grafted chain portion to the backbone chain portion is expressed as the degree of grafting ($X_{dg}$[wt %]) by the following equation:

$$X_{dg}=100(W_2-W_1)/W_1$$

$W_1$: the weight (g) of the base film in a dry state before grafting
$W_2$: the weight (g) of the base film in a dry state after grafting
(2) Ion-Exchange Capacity (meq/g)

The ion-exchange capacity (IEC) of a polymer electrolyte membrane is expressed by the following equation:

$$IEC=[n(\text{acid group})_{obs}]/W_d$$

[n(acid group)$_{obs}$]: the amount of acid groups (mM) in the membrane
$W_d$: the dry weight (g) of the membrane In order to ensure accuracy in the measurement of [n(acid group)$_{obs}$], the membrane was immersed again in 1M sulfuric acid solution at 50° C. for 4 hours until it was completely converted to an acid form (H-form). Thereafter, the membrane was immersed in a 3M aqueous NaCl solution at 50° C. for 4 hours until it was converted to a —SO$_3$Na form; the replaced protons (H$^+$) were subjected to neutralization titration with 0.2M NaOH to determine the concentration of acid groups.
(3) Percent Water Content (%)

A H-form polymer electrolyte membrane that had been stored in water at room temperature was taken out of the water, wiped lightly, and left to stand for a while (about 1 minute); the membrane's weight was found to be $W_s$ (g); thereafter, the membrane was vacuum-dried at 60° C. for 16 hours to measure its dry weight $W_d$ (g); the percent water content of the membrane can be determined from $W_s$ and $W_d$ by the following equation:

Percent water content (%)=100·$(W_s-W_d)/W_d$ (3)

(4) Proton Conductivity ($\Omega^{-1}$ cm$^{-1}$)

The proton conductivity of the polymer electrolyte membrane was measured by the AC method [Shin-Jikken Kagaku Koza (New Course in Experimental Chemistry) 19, Kobunshi Kagaku (Polymer Science)<II>, p. 992, Maruzen] using a conventional membrane resistance measuring cell and an LCR meter E-4925A of Hewlett-Packard so as to measure the membrane resistance ($R_m$). The cell was filled with a 1M aqueous sulfuric acid solution and the resistance between platinum electrodes (5 mm apart) was measured both in the presence and absence of the membrane. The proton conductivity (specific conductance) of the membrane was calculated by the following equation:

$\kappa=1/R_m \cdot d/S$ $\kappa$=proton conductivity ($\Omega^{-1}$ cm$^{-1}$) of the polymer electrolyte membrane
d: the thickness (cm) of the polymer electrolyte membrane
S: the area (cm$^2$) of the polymer electrolyte membrane through which an electric current was applied.

For comparison between measurements of proton conductivity, the DC method was performed using a cell similar to that described by Mark W. Verbrugge, Robert F. Hill et al. (*J. Electrochem. Soc.*, 137, 3770-3777 (1990)) in combination with a potentiostat and a function generator. Good correlation was observed between the measurements obtained by the AC and DC methods. The values in Table 1 (see below) were measurements by the AC method.

(5) Oxidation Resistance (the Time it takes the Proton Conductive Groups to come out of the Polymer Electrolyte Membrane)

The polymer electrolyte membrane was swollen to saturation in an aqueous solution at 60° C. and the resulting weight was taken as the reference; then the membrane was immersed in a 3% aqueous $H_2O_2$ solution at 60° C. and the time at which its weight began to decrease (the time it took the proton conductive groups to come out of the polymer electrolyte membrane) was taken as a measure of its oxidation resistance.

Example 1

A poly(vinylidene fluoride) base film (hereinafter abbreviated as PVDF) was cut to a size of 2 cm×2 cm×50 μm and immersed in acetone containing 0.5 wt % xanthone and 0.5 wt % poly(vinyl acetate) (Mw=100,000) so as to form an undercoat on the film surface that contained xanthone in an amount of 3×10$^{-8}$ moles/cm$^2$. The film was put into a separable glass container equipped with a cock; after degassing, the container was charged with 10 mL of a preliminarily degassed solution of styrene (3.03×10$^{-3}$ mole/L) as diluted with acetone/water (5/1), and the film was immersed in this solution. After purging with nitrogen gas, the glass container was closed and irradiated with ultraviolet rays from a high-pressure mercury lamp (400 W) at 60° C. so as to perform liquid-phase photograft polymerization. The resulting photograft polymerized membrane was washed with toluene and dried. The degree of grafting was found to be 20%. The graft polymerized membrane was charged into a separable glass container equipped with a cock; after degassing, the interior of the glass container was purged with nitrogen gas. Under this condition, the graft polymerized membrane was irradiated with γ-rays at room temperature for a total dose of 500 kGy to create a crosslinked structure.

For sulfonation, the crosslinked graft polymerized membrane was immersed in 0.2M chlorosulfonic acid as diluted with 1,2-dichloroethane, where reaction was performed at 80° C. for 6 hours and the membrane was hydrolyzed by washing with water. The polymer electrolyte membrane prepared in Example 1 was measured for ion-exchange capacity, percent water content, proton conductivity, and oxidation resistance. The results are shown in Table 1.

TABLE 1

| | Degree of grafting (%) | Ion-exchange capacity (meq/g) | Proton conductivity ($[\Omega \cdot cm]^{-1}$) | Percent water content (%) | Oxidation resistance (hours) |
|---|---|---|---|---|---|
| Example 1 | 20 | 1.2 | 0.11 | 31 | 56 |
| Example 2 | 22 | 1.3 | 0.10 | 32 | 720* |
| Example 3 | 20 | 1.2 | 0.10 | 32 | 53 |
| Example 4 | 18 | 1.1 | 0.09 | 27 | 720* |
| Example 5 | 21 | 1.2 | 0.09 | 30 | 60 |
| Example 6 | 20 | 1.2 | 0.08 | 28 | 720* |
| Example 7 | 19 | 1.1 | 0.08 | 27 | 55 |
| Example 8 | 20 | 1.2 | 0.07 | 23 | 720* |
| Example 9 | 40 | 2.0 | 0.14 | 53 | 48 |
| Example 10 | 39 | 1.9 | 0.12 | 51 | 44 |
| Comparative Example 1 Nafion ® 112 | — | 0.9 | 0.06 | 30 | 720* |
| Comparative Example 2 | 20 | 1.2 | 0.03 | 25 | 55 |
| Comparative Example 3 | 40 | 2.0 | 0.07 | 32 | 49 |
| Comparative Example 4 | 20 | 1.2 | 0.09 | 50 | 19 |
| Comparative Example 5 | 20 | 1.2 | 0.11 | 55 | 15 |

*The oxidation resistance test was conducted for a period of up to 720 hours.

In Table 1, oxidation resistance is expressed in hours and the longer the time in hours, the higher the oxidation resistance. To evaluate oxidation resistance in the present invention, a polymer electrolyte membrane under test was immersed in a 3% aqueous hydrogen peroxide ($H_2O_2$) solution and heated at 60° C. until it decomposed and the resulting change in its weight was determined as a function of time. The numeral 720 (hours) as data for some of the Examples and Comparative Example 1 shows that the membrane under test did not decompose at all throughout this period, thus demonstrating its high oxidation resistance.

Percent water content is a measure of the degree of crosslinking. The creation of a crosslinked structure leads to a lower percentage of water content. For instance, the polymer electrolyte membrane of Example 1 that was prepared with a crosslinked structure created in it had a lower percentage of water than the membrane of Comparative Example 5 that was not provided with a crosslinked structure.

Example 2

The procedure of Example 1 was repeated except that divinylbenzene, a polyfunctional vinyl monomer, was added to the liquid-phase graft polymerization system in an amount of 5 mol % of styrene. The degree of grafting was 22%. The results are shown in Table 1.

Example 3

The procedure of Example 1 was repeated except that the xanthone-coated film was not brought into direct contact with the styrene solution but that gas-phase photograft polymerization was performed using the vapor of styrene solution. The degree of grafting was 20%. The results are shown in Table 1.

Example 4

The procedure of Example 3 was repeated except that bis(vinylphenyl)ethane, a polyfunctional vinyl monomer, was added to the gas-phase graft polymerization system in an amount of 5 mol % of styrene. The degree of grafting was 18%. The results are shown in Table 1.

Examples 5 to 8

The procedures of Examples 1 to 4 were repeated except that PVDF was replaced by ethylene tetrafluoroethylene copolymer (hereinafter abbreviated as ETFE). The results are shown in Table 1.

Example 9

The procedure of Example 1 was repeated except that the polymerization time was so controlled as to provide 40% grafting. The results are shown in Table 1.

Example 10

The procedure of Example 3 was repeated except that the polymerization time was so controlled as to provide 39% grafting. The results are shown in Table 1.

Comparative Example 1

Nafion® 112 (DuPont) was measured for its ion-exchange capacity, proton conductivity, percent water content, and oxidation resistance. The results are shown in Table 1.

Comparative Example 2

An ETFE film was cut to a size of 2 cm×2 cm×50 μm and put into a separable glass container (3 cm i.d.×15 cm high) equipped with a cock; after degassing, the interior of the container was replaced with nitrogen gas. Under this condition, the ETFE film was irradiated with γ-rays from a $^{60}$Co source at room temperature for a total dose of 15 kGy. Subsequently, the same glass container was charged with 10 mL of a preliminarily degassed 40 wt % styrene solution as diluted with toluene, and the film was immersed in this solution. After purging with nitrogen gas, the glass container was closed and heated to 50° C. where reaction was performed for 0.5 hours. The resulting graft polymerized membrane was washed with toluene and dried. The degree of grafting was found to be 20%. The graft polymerized membrane was charged into a separable glass container equipped with a cock; after degassing, the interior of the glass container was purged with nitrogen gas. Under this condition, the graft polymerized membrane was irradiated with γ-rays at room temperature for a total dose of 500 kGy to create a crosslinked structure.

For sulfonation, the crosslinked graft polymerized membrane was immersed in 0.2M chlorosulfonic acid as diluted with 1,2-dichloroethane, where reaction was performed at 80° C. for 6 hours and the membrane was hydrolyzed by washing with water. The polymer electrolyte membrane prepared in Comparative Example 2 was measured for ion-exchange capacity, percent water content, proton conductivity, and oxidation resistance. The results are shown in Table 1.

Comparative Example 3

The procedure of Comparative Example 2 was repeated except that the polymerization time was so controlled as to provide 40% grafting. The results are shown in Table 1.

Comparative Example 4

The procedure of Example 5 was repeated to prepare a polymer electrolyte membrane, except that it was not provided with a crosslinked structure by exposure to radiation. The results are shown in Table 1.

Comparative Example 5

The procedure of Example 1 was repeated to prepare a polymer electrolyte membrane, except that it was not provided with a crosslinked structure by exposure to radiation. The results are shown in Table 1.

The polymer electrolyte membrane of the present invention features high oxidation resistance and proton conductivity, so they are suitable for use in fuel cells which, using fuels such as methanol and hydrogen, hold promise for application as power supplies to mobile communication devices, household cogeneration systems, and automobiles or as convenient auxiliary power supplies.

What is claimed is:

1. A process for producing a polymer electrolyte membrane for fuel cells comprising:
   providing a polymer base film;
   forming on the polymer base film a layer which contains a photopolymerization initiator and a fixing agent;
   having formed the layer on the base film, irradiating the polymer base film with ultraviolet rays while the surface of the layer is placed in contact with a liquid mixture of a vinyl monomer capable of retaining sulfonic acid groups and a solvent so that the vinyl monomer is graft polymerized into the polymer base film in a liquid-phase system;
   irradiating the grafted polymer base film with electron beams or gamma rays to cause multiplex crosslinkinq between grafted molecular chains themselves, between molecular chains themselves in the base film, and between grafted molecular chains and molecular chains in the base film; and
   introducing sulfonic acid groups into aromatic rings in the grafted molecular chains.

2. A process for producing a polymer electrolyte membrane for fuel cells comprising:
   providing a polymer base film;
   forming on the polymer base film a layer which contains a photopolymerization initiator and a fixing agent;
   having formed the layer on the base film, irradiating the polymer base film with ultraviolet rays while the surface of the layer is placed in contact with a liquid mixture of a vinyl monomer capable of retaining sulfonic acid groups, a polyfunctional vinyl monomer necessary for creating a chemical crosslinked structure, and a solvent so that the vinyl monomers are graft polymerized into the polymer base film in a liquid-phase system;
   irradiating the grafted polymer base film with electron beams or gamma rays to cause multiplex crosslinking between grafted molecular chains themselves, between molecular chains themselves in the base film, and between grafted molecular chains and molecular chains in the base film; and introducing sulfonic acid groups into aromatic rings in the grafted molecular chains.

3. A process for producing a polymer electrolyte membrane for fuel cells comprising:

providing a polymer base film;

forming on the polymer base film a layer which contains a photopolymerization initiator and a fixing agent;

having formed the layer on the base film, irradiating the polymer base film with ultraviolet rays while the surface of the layer is placed in contact with the vapor of a liquid mixture of a vinyl monomer capable of retaining sulfonic acid groups and a solvent so that the vinyl monomer is graft polymerized into the polymer base film in a gas-phase system;

irradiating the grafted polymer base film with electron beams or gamma rays to cause multiplex crosslinking between grafted molecular chains themselves, between molecular chains themselves in the base film, and between grafted molecular chains and molecular chains in the base film; and introducing sulfonic acid groups into aromatic rings in the grafted molecular chains.

4. A process for producing a polymer electrolyte membrane for fuel cells comprising:

providing a polymer base film;

forming on the polymer base film a layer which contains a photopolymerization initiator and a fixing agent;

having formed the layer on the base film, irradiating the polymer base film with ultraviolet rays while the surface of the layer is placed in contact with the vapor of a liquid mixture of a vinyl monomer capable of retaining sulfonic acid groups, a polyfunctional vinyl monomer necessary for creating a chemical crosslinked structure, and a solvent so that the vinyl monomers are graft polymerized into the polymer base film in a gas-phase system;

irradiating the grafted polymer base film with electron beams or gamma rays to cause multiplex crosslinking between grafted molecular chains themselves, between molecular chains themselves in the base film, and between grafted molecular chains and molecular chains in the base film; and introducing sulfonic acid groups into aromatic rings in the grafted molecular chains.

5. A polymer electrolyte fuel cell membrane that is produced by the process according to any one of claims 1 to 4, wherein the polymer base film is composed of an olefinic polymer or a fluropolymer.

6. A polymer electrolyte fuel cell membrane that is produced by the process according to any one of claims 1 to 4, wherein the degree of grafting, defined as the ratio of the weight of the grafted molecular chains to the weight of the base film, is 6 to 80% and the membrane has an ion-exchange capacity of 0.3 to 3.0 meq/g.

7. A fuel cell membrane-electrode assembly comprising the polymer electrolyte membrane according to any one of claims 1 to 4 which is joined to an anode and a cathode.

* * * * *

UNITED STATES PATENT AND TRADEMARK OFFICE
CERTIFICATE OF CORRECTION

PATENT NO.        : 7,993,793 B2                                      Page 1 of 1
APPLICATION NO.   : 11/727177
DATED             : August 9, 2011
INVENTOR(S)       : Masaru Yoshida et al.

It is certified that error appears in the above-identified patent and that said Letters Patent is hereby corrected as shown below:

Column 12, Line 45, in claim 1, delete "crosslinkinq" and insert -- crosslinking --, therefor.

Signed and Sealed this
Fourteenth Day of February, 2012

David J. Kappos
*Director of the United States Patent and Trademark Office*